United States Patent
Young et al.

(10) Patent No.: US 9,768,445 B2
(45) Date of Patent: Sep. 19, 2017

(54) ACTIVATION OF LAVES PHASE-RELATED BCC METAL HYDRIDE ALLOYS FOR ELECTROCHEMICAL APPLICATIONS

(71) Applicant: Ovonic Battery Company, Inc., Rochester Hills, MI (US)

(72) Inventors: Kwo-hsiung Young, Troy, MI (US); Taihei Ouchi, Oakland Township, MI (US); Baoquan Huang, Troy, MI (US)

(73) Assignee: Ovonic Battery Company, Inc., Rochester Hills, MI (US)

( * ) Notice: Subject to any disclaimer, the term of this patent is extended or adjusted under 35 U.S.C. 154(b) by 454 days.

(21) Appl. No.: 14/340,913

(22) Filed: Jul. 25, 2014

(65) Prior Publication Data

US 2016/0028083 A1    Jan. 28, 2016

(51) Int. Cl.
| | |
|---|---|
| *H01M 4/38* | (2006.01) |
| *C01B 6/24* | (2006.01) |
| *C01B 3/00* | (2006.01) |
| *H01M 4/02* | (2006.01) |
| *H01M 4/24* | (2006.01) |
| *H01M 10/30* | (2006.01) |
| *H01M 12/08* | (2006.01) |

(52) U.S. Cl.
CPC .......... *H01M 4/383* (2013.01); *C01B 3/0031* (2013.01); *C01B 6/24* (2013.01); *C01P 2002/72* (2013.01); *C01P 2004/03* (2013.01); *C01P 2006/40* (2013.01); *H01M 4/242* (2013.01); *H01M 10/30* (2013.01); *H01M 12/08* (2013.01); *H01M 2004/027* (2013.01); *Y02E 60/128* (2013.01); *Y02E 60/327* (2013.01)

(58) Field of Classification Search
CPC ............... H01M 4/483; H01M 4/383; H01M 2004/027; H01M 4/242; H01M 10/30; H01M 12/08; C01B 6/24; C01B 3/0031; C22C 14/00; C01P 2002/72; C01P 2004/03; C01P 2006/40; Y02E 60/128; Y02E 60/327; C22F 1/183; C22F 1/11
See application file for complete search history.

(56) References Cited

U.S. PATENT DOCUMENTS

| | | | |
|---|---|---|---|
| 4,551,400 A | 11/1985 | Sapru et al. | |
| 5,536,591 A | 7/1996 | Fetcenko et al. | |
| 6,120,936 A | 9/2000 | Young et al. | |
| 6,210,498 B1 | 4/2001 | Ovshinsky et al. | |
| 6,338,764 B1 | 1/2002 | Mori et al. | |
| 2005/0067060 A1* | 3/2005 | Huang ................. | C01B 3/0031 148/421 |

FOREIGN PATENT DOCUMENTS

| | | |
|---|---|---|
| JP | 09-035708 A | 2/1997 |
| JP | 10-245653 A | 9/1998 |
| JP | 11-106859 A | 4/1999 |

OTHER PUBLICATIONS

Chai, Y., et al., "Structure and electrochemical properties of Ti025V0.35CR0.40-xNix (x=0.05–0.40) solid solution alloys," International Journal of Hydrogen Energy 30 (2005) 279-283.
Chai, Y., et al., "Crystal structural and electrochemical properties of Ti0.17Zr0.08V0.35Cr0.10Ni0.30_xMnx (x=0–0.12) alloys," Materials Science and Engineering B 147 (2008) 47-51.
Chen, L., et al., "Structural and electrochemical characteristics of V2.1TiNi0.5Hf0.05M0.152 (M=Co, Cr) hydrogen storage electrode alloys," Materials Chemistry and Physics 92 (2005) 554-558.
Gao, M., et al., "Effects of rare earth elements substitution for Ti on the structure and electrochemical properties of a Fe-doped Ti—V-based hydrogen storage alloy," Journal of Alloys and Compounds 484 (2009) 249-255.
Li, R., et al., "Structural and electrochemical properties of hydrogen storage alloys Ti0.8Zr0.2V2.7Mn0.5Cr0.8Nix (x=1.50–2.25)," Journal of Alloys and Compounds 373 (2004) 223-230.
Li, S., et al., "Structures and electrochemical characteristics of Ti0.26Zr0.07V0.24Mn0.1Ni0.33Mox (x=0–0.1) hydrogen storage alloys," Materials Science and Engineering B 150 (2008) 168-174.
Liu, Y., et al., "Electrochemical performances of the Pd-added Ti—V-based hydrogen storage alloys," International Journal of Hydrogen Energy 33 (2008) 728-734.
Miao, H., et al., "Microstructure and electrochemical properties of Ti—V-based multiphase hydrogen storage electrode allloys Ti0.8Zr0.2V2.7Mn0.5Cr0.8-xNi1.25Fex (x=0.0–0.8)," International Journal of Hydrogen Energy 32 (2007) 3947-3953.
Miao, H., "An improvement on cycling stability of Ti—V—Fe-based hydrogen storage alloys with Co substitution for Ni," Journal of Power Sources 184 (2008) 627-632.
Pan, H., et al., "Investigation of the Structural and Electrochemical Properties of Superstoichiometric Ti—Zr—V—Mn—Cr—Ni Hydrogen Storage Alloys," Journal of the Electrochemical Society, 149 (7) A829-A833 (2002).
Li, R., et al., "Investigation of microstructure and electrochemical properties of Ti0.8Zr0.2V2.7MN0.5+xCr0.8Ni1.5-x hydrogen storage alloys," Journal of Alloys and Compounds 432 (2007) 183-188.
Pan, H., et al., "Structure and electrochemical properties of the Fe substituted Ti—V-based hydrogen storage alloys," Journal of Alloys and Compounds 463 (2008) 189-195.

(Continued)

*Primary Examiner* — Jessee Roe
(74) *Attorney, Agent, or Firm* — Dinsmore & Shohl LLP (57) ABSTRACT

Laves phase-related BCC metal hydride alloys historically have limited electrochemical capabilities. Provided are processes of activating these alloys to produce hydrogen storage materials with greater than 200 mAh/g capacities and commonly much greater than 300 mAh/g capacities. The processes include cooling the alloy during hydrogenation to reduced temperatures or by subjecting the materials to significantly increased hydrogen pressures. Temperatures in many embodiments do not exceed 300° C. By decreasing the temperature or increasing the hydrogen pressure the phase structure of the material is optimized to increase a synergistic effect between multiple phases in the resulting alloy thereby greatly improving the electrochemical capacities.

14 Claims, 4 Drawing Sheets

(56) References Cited

OTHER PUBLICATIONS

Qiu, S., et al., "The electrochemical performances of Ti—V-based hydrogen storage composite electrodes prepared by ball milling method," International Journal of Hydrogen Energy 33 (2008) 7471-7478.

Qiu, S., et al., "Electrochemical kinetics and its temperature dependence behaviors of Ti0.17Zr0.08V0.35Cr0.10Ni0.30 alloy electrode," Journal of Alloys and Compounds 471 (2009) 453-456.

Shocun, L., et al., "Effect of substitution of chromium for nickel on structure and electrochemical characteristic of Ti0.26Zr0.07V0.24Mn0.1Ni0.33 multi-phase hydrogen storage alloy," Materials Chemistry and Physics 113 (2009) 96-102.

Song, X.Y., et al., "Microstructure and electrochemical properties of Ti-containing AB2 type hydrogen storage electrode alloy," International Journal of Hydrogen Energy 25 (2000) 649-656.

Yin, W., et al., "Structure and electrochemical characteristics of TiV1.1Mn0.9Nix (x=0.1-0.7) alloys," Electrochimica Acta 52 (2007) 2723-2728.

Young, K., et al., "Structural, hydrogen storage, and electrochemical properties of Laves phase-related bodycentered-cubic solid solution metal hydride alloys," International Journal of Hydrogen Energy XXX (2014) 1-11.

Yu, X.B., et al., "A Ti—V-based bcc phase alloy for use as metal hydride electrode with high discharge capacity," The Journal of Chemical Physics 121 (2) (Jul. 8, 2004) 987-990.

Yu, J., et al., "The effects of partial substitution of Mn by Cr on the electrochemical cycle life of Ti—Zr—V—Mn—Ni alloy electrodes of a Ni/Mh battery," Journal of Alloys and Compounds 278 (1998) 283-290.

Yuqing, Q., et al., "Effect of Cerium on Microstructure and Electrochemical Performance of Ti—V—Cr—Ni Electrode Alloy," Journal of Rare Earths 25 (2007) 341-347.

Zhu, Y., et al., "Influence of annealing treatment on Laves phase compound containing a V-based BCC solid solution phase—Part II: Electrochemical properties," International Journal of Hydrogen Energy 28 (2003) 395-401.

Zhu, Y., et al., "A study on improving the cycling stability of (Ti0.8Zr0.2)(V0.533Mn0.107Cr0.16Ni0.2)4 hydrogen storage electrode alloy by means of annealing treatment II. Effects on the electrochemical properties," Journal of Alloys and Compounds 348 (2003) 301-308.

Zhu, Y., et al., "Electrochemical studies on the Ti—Zr—V—Mn—Cr—Ni hydrogen storage electrode alloys," International Journal of Hydrogen Energy 28 (2003) 311-316.

International Search Report for Application Serial No. PCT/US2015/040892, filed Jul. 17, 2015, 11 pages.

Young, K. et al., "Structural, hydrogen storage, and electrochemical properties of Laves phase-related body-centered-cubic solid solution metal hydride alloys," Int. J. Hydrogen Energy, http://dx.doi.org/10.1016/j.ijhydene.2014.01.134 (article in press) (accepted Jan. 22, 2014).

Nakamura, Y. et al., "New hydride phase with a deformed FCC structure in the Ti—V—Mn solid solution-hydrogen system," Journal of Alloys and Compounds, 311 (2000) pp. 317-321.

\* cited by examiner

ACTIVATION OF LAVES PHASE-RELATED BCC METAL HYDRIDE ALLOYS FOR ELECTROCHEMICAL APPLICATIONS

FIELD OF THE INVENTION

This invention relates to alloy materials and methods for their fabrication. In particular, the invention relates to metal hydride alloy materials that are capable of absorbing and desorbing hydrogen. Methods of activating BCC metal hydride alloys are provided that produce high capacity for use in electrochemical applications.

BACKGROUND OF THE INVENTION

Certain metal hydride (MH) alloy materials are capable of absorbing and desorbing hydrogen. These materials can be used as hydrogen storage media, and/or as electrode materials for fuel cells and metal hydride batteries including nickel/metal hydride (Ni/MH) and metal hydride/air battery systems.

When an electrical potential is applied between the cathode and a MH anode in a MH cell, the negative electrode material (M) is charged by the electrochemical absorption of hydrogen to form a metal hydride (MH) and the electrochemical evolution of a hydroxyl ion. Upon discharge, the stored hydrogen is released to form a water molecule and evolve an electron. The reactions that take place at the positive electrode of a nickel MH cell are also reversible. Most MH cells use a nickel hydroxide positive electrode. The following charge and discharge reactions take place at a nickel hydroxide positive electrode.

In a MH cell having a nickel hydroxide positive electrode and a hydrogen storage negative electrode, the electrodes are typically separated by a non-woven, felted, nylon or polypropylene separator. The electrolyte is usually an alkaline aqueous electrolyte, for example, 20 to 45 weight percent potassium hydroxide.

One particular group of MH materials having utility in MH battery systems is known as the $AB_x$ class of material with reference to the crystalline sites occupied by its member component elements. $AB_x$ type materials are disclosed, for example, in U.S. Pat. No. 5,536,591 and U.S. Pat. No. 6,210,498. Such materials may include, but are not limited to, modified $LaNi_5$ type ($AB_5$) as well as the Laves-phase based active materials ($AB_2$). These materials reversibly form hydrides in order to store hydrogen. Such materials utilize a generic Ti—Zr—Ni composition, where at least Ti, Zr, and Ni are present with at least one or more of Cr, Mn, Co, V, and Al. The materials are multiphase materials, which may contain, but are not limited to, one or more Laves phase crystal structures.

Other $AB_x$ materials include the Laves phase-related body centered cubic (BCC) materials that are a family of MH alloys with a two-phase microstructure including a BCC phase and a Laves phase historically present as C14 as an example. These materials exhibit high density of the phase boundaries that allow the combination of higher hydrogen storage capacity of BCC and good hydrogen absorption kinetics and relatively high surface catalytic activity of the C14 phase. Many studies have been undertaken to optimize these materials. Young et al., *Int. J. Hydrogen Energy*, http://dx.doi.org/10.1016/j.ijhydene.2014.01.134 (article in press) describes a systematic study of these materials with a broad range of BCC/C14 ratio. These results reveal that while these materials have many desirable properties, the electrochemical storage capacity produced by these materials does not exceed 175 mAh/g.

Prior $AB_5$ MH materials suffer from insufficient hydrogen-absorbing capabilities which equates to low energy density. This has made increasing the capacity of systems employing these materials exceedingly difficult. On the other hand, $AB_2$ alloys commonly suffer from high cost and low high-rate performance.

Rare earth (RE) magnesium-based $AB_3$- or $A_2B_7$-types of MH alloys are promising candidates to replace the currently used $AB_5$ MH alloys as negative electrodes in Ni/MH batteries due in part to their higher capacities. While most of the RE-Mg—Ni MH alloys were based on La-only as the rare earth metal, some Nd-only $A_2B_7$ ($AB_3$) alloys have recently been reported. In these materials, the $AB_{3.5}$ stoichiometry is considered to provide the best overall balance among storage capacity, activation, high-rate dischargeability (HRD), charge retention, and cycle stability. The pressure-concentration-temperature (PCT) isotherm of one Nd-only $A_2B_7$ alloy showed a very sharp take-off angle at the α-phase [K. Young, et al., *Alloys Compd*. 2010; 506: 831] which can maintain a relatively high voltage during a low state-of-charge condition. Compared to commercially available $AB_5$ MH alloys, a Nd-only $A_2B_7$ exhibited a higher positive electrode utilization rate and less resistance increase during a 60° C. storage, but also suffered higher capacity degradation during cycling [K. Young, et al., *Int. J. Hydrogen Energy*, 2012; 37:9882]. Another issue with known $A_2B_7$ alloys is that they suffer from inferior HRD relative to the prior $AB_5$ alloy systems.

As such, there is a need for improved hydrogen storage materials and processes of their manufacture or activation. As will be explained herein below, the present invention addresses these needs by proving Laves phase-related BCC metal hydride alloys that for the first time exhibit greatly improved electrochemical properties. These and other advantages of the invention will be apparent from the drawings, discussion, and description which follow.

SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

Addressing the needs of providing stable high capacity nickel metal hydride battery systems is desirable. Provided are processes that are useful for generating increased stable capacity relative to prior methods. As such, a process for activating a Laves phase-related BCC metal hydride alloy of Formula I:

where w+x+y+z=1, 0.1≤w≤0.6, 0.1≤x≤0.6, 0.01≤y≤0.6, and M is selected from the group consisting of B, Al, Si, Sn and transition metals, where the process includes: subjecting the laves phase-related BCC metal hydride alloy to an atmosphere comprising hydrogen at a hydrogenation pressure; and cooling the alloy during the step of subjecting to produce an activated metal hydride alloy having a capacity in excess of 200 milliamperes per gram—a level not achieved by prior activation processes. In some embodiments, the step of cooling is at a maximum activation temperature of 300 degrees Celsius or less. The atmosphere is at a hydrogenation pressure that is optionally 1.4 megapascals or greater, optionally 6 megapascals or greater. The processes produce an activated metal hydride alloy optionally having a capacity of 300 milliamperes per gram or greater, optionally 350 milliamperes per gram or greater. In some embodiments the activated metal hydride alloy has less than 24% C14 phase. In some embodiments, the activated metal hydride alloy is predominantly a combination of BCC phase and Laves phase, said BCC phase in abundance of greater than 5% and less than 95%, the Laves phase in abundance of greater than 5% and less than 95%. Optionally, the activated metal hydride alloy includes a BCC phase crystallite size of less than 400 angstroms. In any of the foregoing or combinations thereof the laves phase-related BCC metal hydride alloy is optionally of Formula II:

$$Ti_{0.4+x/6}Zr_{0.6-x/6}Mn_{0.44}Ni_{1.0}Al_{0.02}Co_{0.09}(VCr_{0.3}Fe_{0.063})_x \quad (II)$$

where x is 0.7 to 2.8.

Also provided are activated alloys having excellent capacity far superior to other alloys of like elemental composition where the capacity is at or in excess of 200 milliamperes per gram, optionally in excess of 300 milliamperes per gram. The activated alloy is defined by Formula I:

$$Ti_wV_xCr_yM_z \quad (I)$$

where w+x+y+z=1, 0.1≤w≤0.6, 0.1≤x≤0.6, 0.01≤y≤0.6 and M is selected from the group consisting of B, Al, Si, Sn and transition metals. Optionally, the alloy includes predominantly a combination of BCC phase and Laves phase, said BCC phase in abundance of greater than 5% and less than 95%, said Laves phase in abundance of greater than 5% and less than 95%. Optionally the alloy includes a BCC phase crystallite size of less than 400 angstroms. In some embodiments, the alloys comprises a material of Formula II:

$$Ti_{0.4+x/6}Zr_{0.6-x/6}Mn_{0.44}Ni_{1.0}Al_{0.02}Co_{0.09}(VCr_{0.3}Fe_{0.063})_x \quad (II)$$

where x is 0.7 to 2.8.

BRIEF DESCRIPTION OF EMBODIMENTS OF THE INVENTION

The following description of particular embodiment(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second (or other) element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Historical hydrogen storage alloys having Laves phase-related BCC structures have been studied for some time to identify how to promote a synergistic effect between the C14 and BCC phases of the system. Prior studies substituting A-site and B-site elements have been performed on numerous mixed phase alloys some of which were found to increase or decrease C14 phase abundance. Compositional refinements have continued as a way to improve both the gaseous and electrochemical hydrogen storage properties of these alloys. While these efforts met with some success and often mixed conclusions, achieving capacities in excess of 200 mAh/g remained elusive. The processes provided herein represent a simple and elegant solution to these problems by producing activated hydrogen storage alloys of the Laves-phase related BCC structured materials that exhibit excellent electrochemical properties. The processes can be used to either reduce or limit the amount of C14 phase, increase the relative amount of BCC phase to improve the hydrogen storage capacity, or both. Alloys produced by these methods are also provided.

Provided are hydrogen storage alloys having a Laves phase-related BCC structure that exhibit excellent electrochemical properties unexpectedly superior to prior materials of similar composition. A Laves-phase related BCC metal hydride alloy of the composition of Formula I is provided.

$$Ti_w V_x Cr_y M_z \quad (I)$$

where w+x+y+z=1, 0.1≤w≤0.6, 0.1≤x≤0.6, 0.01≤y≤0.6 and M is selected from the group consisting of B, Al, Si, Sn and one or more transition metals. The alloy is activated by particular processes to promote formation of increased BCC phase and limit $AB_2$ phase in the resulting materials. The result is an activated metal hydride alloy having improved electrochemical properties including a capacity at or in excess of 200 mAh/g.

Optionally, a Laves-phase related BCC metal hydride alloy of the composition of Formula II:

$$Ti_{0.4+x/6} Zr_{0.6-x/6} Mn_{0.44} Ni_{1.0} Al_{0.02} Co_{0.09} (VCr_{0.3} Fe_{0.063})_x \quad (II)$$

where x is 0.7 to 2.8.

In some embodiments, an activated metal hydride alloy includes a capacity well in excess of 200 mAh/g, optionally 220 mAh/g, 240 mAh/g, 260 mAh/g, 280 mAh/g, 300 mAh/g, 310 mAh/g, 320 mAh/g, 330 mAh/g, 340 mAh/g, 350 mAh/g, 360 mAh/g, 370 mAh/g, or more. Optionally, an activated metal hydride alloy includes a capacity between 200 and 400 mAh/g. Optionally, an activated metal hydride alloy includes a capacity between 300 and 400 mAh/g. Optionally, an activated metal hydride alloy includes a capacity between 300 and 380 mAh/g.

The physical structure of the material along with its composition and lack of oxidation relative to prior alloy materials of similar chemical composition promote the excellent electrochemical properties of the activated metal hydride alloy. An activated metal hydride alloy optionally is predominantly formed of BCC phase and Laves phase structure. Without being limited to one particular theory, it is believed that the predominance of the structure being in the BCC phase and Laves phase increases a synergistic effect produced by the presence of the two phases. As such, the activated metal hydride alloy produced by the processes as disclosed herein optionally have BCC phase in abundance of greater than 5% and less than 95%, a Laves phase in abundance of greater than 5% and less than 95% with the combination of BCC phase and Laves phase being in excess of 50% of the material structure. Optionally, the BCC phase is at or between 10% and 95%, 20% and 95%, 30% and 95%, 40% and 95%, 50% and 95%, 60% and 95%, 70% and 95%, or 80% and 95%, optionally also in any such instance with a Laves phase in excess of 5%. Optionally, the Laves phase is at or between 10% and 95%, 20% and 95%, 30% and 95%, 40% and 95%, 50% and 95%, 60% and 95%, 70% and 95%, or 80% and 95%, optionally also in any such instance with a BCC phase in excess of 5%. In some embodiments, composition has a C14 Laves phase that is less than 30%, optionally less than 25%, optionally less than 20%, optionally less than 15%, optionally less than 14%, optionally, less than 13%, optionally less than 12%.

The activated hydrogen storage alloy is provided with a crystallite size of the BCC phase that is sufficiently small to promote the electrochemical properties. The alloys produced by the presently described process have a BCC crystallite size of 400 Å or less, optionally 390 Å or less, optionally 380 Å or less, optionally 370 Å or less, optionally 360 Å or less, optionally 350 Å or less, optionally 340 Å or less, optionally 330 Å or less, optionally 320 Å or less, optionally 310 Å or less, optionally 300 Å or less, optionally 290 Å or less, optionally 280 Å or less, optionally 270 Å or less, optionally 260 Å or less, optionally 250 Å or less, optionally 240 Å or less, optionally 230 Å or less, optionally 220 Å or less, optionally 210 Å or less, optionally 200 Å or less. Optionally, the crystallite size of the BCC phase is from 200 Å to 300 Å.

The physical, structural, and electrochemical properties of the active hydrogen storage alloy are created by new methods described herein of hydriding the base materials to prevent too much Laves phase from forming in the material, increase the amount of BCC phase structure to the material, or combinations thereof. As such, processes of activating (hydriding) a Laves phase-related BCC metal hydride alloy of Formula I or Formula II are provided. A process includes subjecting the Laves phase-related BCC metal hydride alloy to an atmosphere including hydrogen at a hydrogenation pressure and simultaneously cooling the alloy to produce an activated metal hydride alloy having a capacity in excess of 200 mA/g. Subjecting a Laves phase-related BCC metal hydride alloy to hydrogen at elevated pressures will increase the temperature of the material due to the exothermic nature of the hydride formation reaction. It was discovered that allowing the temperature of the alloy to increase in an uncontrolled manner is detrimental to the resulting electrochemical properties of the activated alloy. As such, the processes include an active cooling step. Without being limited one particular theory, controlling the temperature of the material during hydriding promotes excess $AB_2$ phase structure from forming in the alloy during activation. Temperature control is achieved by cooling the reaction vessel such as with a water jacketed system or bath, or by other methods known in the art. Optionally, the reaction temperature of the alloy does not exceed 300° C.

In some embodiments, the temperature of the alloy is maintained between room temperature and optionally 300° C., optionally 295° C., optionally 290° C., optionally 285° C., optionally 280° C., optionally 275° C., optionally 270° C., optionally 260° C., optionally 250° C., optionally 240° C., optionally 230° C., optionally 220° C., optionally 210° C., optionally 200° C., optionally 190° C., optionally 180° C., optionally 170° C., optionally 160° C., optionally 150° C., optionally 140° C., optionally 130° C., optionally 120° C., optionally 110° C., optionally 100° C., optionally 90° C., optionally 80° C., optionally 70° C., optionally 60° C., optionally 50° C., optionally 40° C., optionally 30° C. In some embodiments, an alloy is maintained during activation to a temperature between room temperature and 300° C., or to any value or range therebetween.

Increasing hydrogen pressure was also discovered to be useful to promote formation of increased amounts of BCC phase in the resulting activated hydrogen storage alloy. As such, a process optionally includes activating the Laves phase-related BCC metal hydride alloy at a hydrogenation pressure of 1.4 MPa or greater, optionally 1.5 MPa or greater, optionally 1.8 MPa or greater, optionally 2 MPa or greater, optionally 3 MPa or greater, optionally 4 MPa or greater, optionally 5 MPa or greater, optionally 6 MPa or greater.

In some embodiments, both a hydrogenation pressure in excess of 1.4 MPa is combined with controlling the temperature to 300° C. or less. As such, a process optionally includes activating an alloy with a hydrogenation pressure of between 1.4 MPa to 6 MPa, or greater, with cooling to prevent the alloy from exceeding 300° C., optionally 295° C., optionally 290° C., optionally 285° C., optionally 280° C., optionally 275° C., optionally 270° C., optionally 260° C., optionally 250° C., optionally 240° C., optionally 230° C., optionally 220° C., optionally 210° C., optionally 200° C., optionally 190° C., optionally 180° C., optionally 170° C., optionally 160° C., optionally 150° C., optionally 140° C., optionally 130° C., optionally 120° C., optionally 110° C., optionally 100° C., optionally 90° C., optionally 80° C., optionally 70° C., optionally 60° C., optionally 50° C., optionally 40° C., optionally 30° C. At any one of the above temperature ranges the hydrogenation pressure is optionally between 6 MPa and optionally 1.4 MPa, optionally 1.5 MPa, optionally 1.6 MPa, optionally 1.7 MPa, optionally 1.8 MPa, optionally 1.9 MPa, optionally 2 MPa, optionally 2.1 MPa, optionally 2.2 MPa, optionally 2.3 MPa, optionally 2.4 MPa, optionally 2.5 MPa, optionally 2.6 MPa, optionally 2.7 MPa, optionally 2.8 MPa, optionally 2.9 MPa, optionally 3 MPa, optionally 3.1 MPa, optionally 3.2 MPa, optionally 3.3 MPa, optionally 3.4 MPa, optionally 3.5 MPa, optionally 3.6 MPa, optionally 3.7 MPa, optionally 3.8 MPa, optionally 3.9 MPa, optionally 4 MPa, optionally 4.1 MPa, optionally 4.2 MPa, optionally 4.3 MPa, optionally 4.4 MPa, optionally 4.5 MPa, optionally 4.6 MPa, optionally 4.7 MPa, optionally 4.8 MPa, optionally 4.9 MPa, optionally 5 MPa, optionally 5.1 MPa, optionally 5.2 MPa, optionally 5.3 MPa, optionally 5.4 MPa, optionally 5.5 MPa, optionally 5.6 MPa, optionally 5.7 MPa, optionally 5.8 MPa, optionally 5.9 MPa. In some embodiments the hydrogenation pressure is 6 MPa or greater.

The resulting activated hydrogen storage alloy produced by the provided processes possesses capacities that nearly double and often more than double those of compositionally identical materials produced in traditional manners.

Various aspects of the present invention are illustrated by the following non-limiting examples. The examples are for illustrative purposes and are not a limitation on any practice of the present invention. It will be understood that variations and modifications can be made without departing from the spirit and scope of the invention.

EXPERIMENTAL

A series of metal hydride alloys of Formula I or II were prepared and hydrided by various conditions in connection with an experimental series illustrating the principles of the present invention. The alloys had the basic design of the following atomic percentages: Ti 13.6; Zr 2.1; V 44.0; Cr 13.2; Mn 6.9; Fe 2.7; Co 1.4; Ni 15.7; and Al 0.3. The materials were purchased from Chuo Denki Kogyo and are melted under conditions of continuous argon flow using a non-consumable tungsten electrode and a water cooled copper tray. Prior to formation, the residual oxygen concentration in the system was reduced by subjecting a piece of sacrificial titanium to several melt-cool cycles. Study ingots where then subjected to several re-melt cycles with turning over to ensure uniformity in chemical composition.

ICP Analyses

The chemical composition of the prepared alloy samples was determined using a Varian Liberty 100 inductively coupled plasma optical emission spectrometer (ICP-OES) in accord with principles known in the art. The ICP results from ingots prior to activation in atomic percentage are illustrated in Table 1.

TABLE 1

Designed compositions and ICP compositional results in atomic percent.

| Alloy | Ti | Zr | V | Cr | Mn | Fe | Co | Ni | Al | B/A ratio |
|---|---|---|---|---|---|---|---|---|---|---|
| Design | 13.6 | 2.1 | 44.0 | 13.2 | 6.9 | 2.7 | 1.4 | 15.7 | 0.3 | 5.37 |
| ICP | 13.8 | 2.0 | 43.1 | 13.1 | 6.5 | 2.8 | 1.4 | 16.7 | 0.6 | 5.33 |

The as-cast composition is in excellent agreement with the composition as designed.

Phase Distribution and Composition

Figure 1:
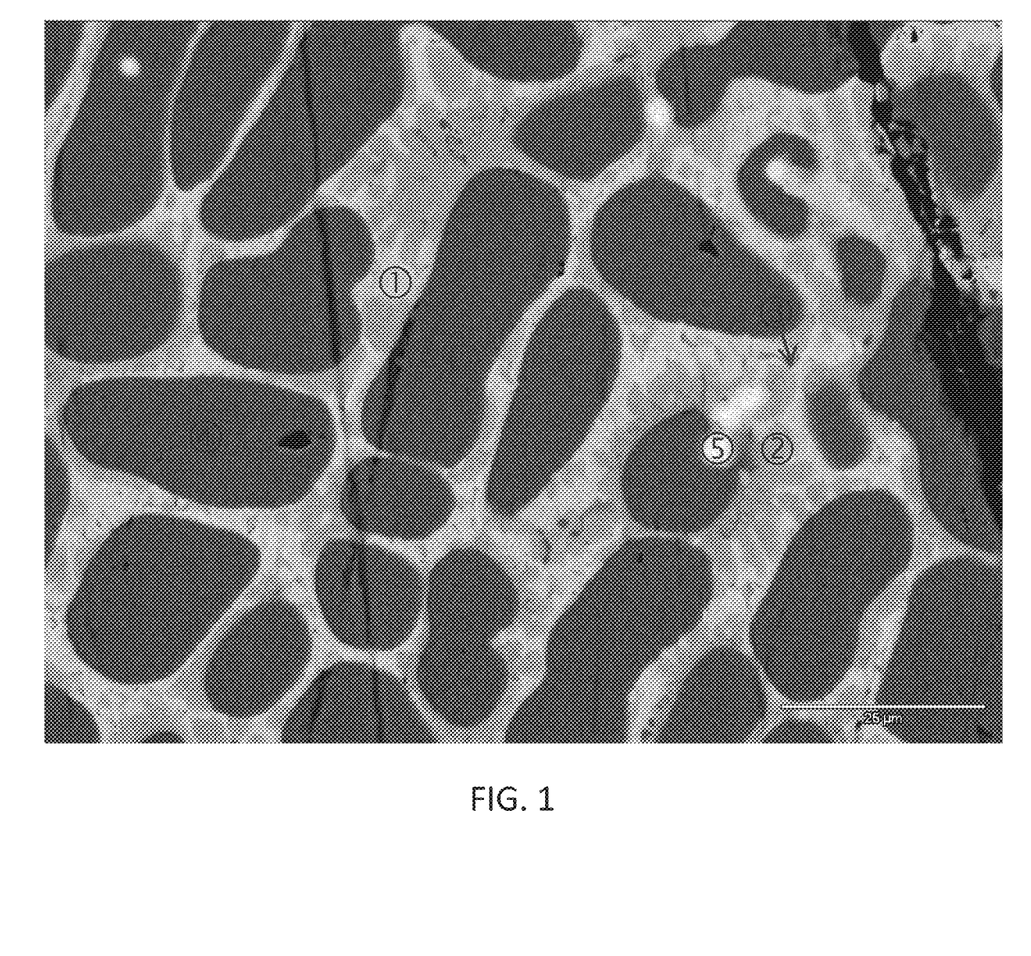
FIG. 1 illustrates alloy phase distribution as observed in an SEM image of a hydrogen storage alloy prior to activation.

The alloy phase distribution and composition were examined using a JEOL-JSM6320F scanning electron microscope with energy dispersive spectroscopy (EDS) capability. Samples were mounted and polished on epoxy blocks, rinsed and dried before entering the SEM chamber. Back scattering electron images are presented in FIG. 1. Several areas are chosen for study by EDS which are each depicted with a numeral in FIG. 1. The results of the EDS measurements are illustrated in Table 2.

TABLE 2

| Numeral | Ti | Zr | V | Cr | Mn | Fe | Co | Ni | Al | B/A | Phase |
|---|---|---|---|---|---|---|---|---|---|---|---|
| 1 | 22.4 | 9 | 19.5 | 2.4 | 7.1 | 2.8 | 1.8 | 33.8 | 1 | 2.18 | $AB_2$ |
| 2 | 36.3 | 2.4 | 8.8 | 1.3 | 3.9 | 3.3 | 3.6 | 39 | 1.3 | 1.58 | $Zr_xNi_y$ |
| 3 | 35.1 | 8.2 | 16.1 | 1.4 | 4.5 | 2 | 1.4 | 30.8 | 0.5 | 1.31 | $Zr_xNi_y$ |
| 4 | 5.7 | 0.1 | 58.7 | 19.2 | 6.9 | 2.7 | 1 | 5.3 | 0.5 | 16.26 | BCC |
| 5 | 1.6 | 93.1 | 2.8 | 1 | 0.3 | 0.2 | 0.1 | 0.9 | 0.1 | 0.06 | Zr |

Hydriding

The alloys of Example 1 are subjected to various activation conditions by varying either the maximum temperature of the alloy during activation through cooling the system, by altering the hydrogen pressure, or both. Four activation processes are depicted in Table 3.

TABLE 3

Exemplary Activation Conditions

| | |
|---|---|
| As cast | Hand grind (mortar & pestle) |
| Control | 1.4 MPa activation @350° C. Heat Degas @350° C. for 1 hour |
| | 1.4 MPa Stabilization @350° C. Heat Degas @350° C. for 1 hour |
| | 1.4 MPa Stabilization @350° C. Heat Degas @300° C. for 1 hour |
| | 1.2 MPa Manual PCT @60° C. Degas @300° C. for 1 hour |

TABLE 3-continued

Exemplary Activation Conditions

| As cast | Hand grind (mortar & pestle) |
|---|---|
| Example 1 | 1.2 MPa Manual PCT @30° C. |
| | Degas @300° C. for 1 hour |
| | Hand grind (mortar & pestle) |
| | 1.4 MPa activation @300° C. Heat |
| | Degas @300° C. for 1 hour |
| | 1.4 MPa Stabilization @300° C. Heat |
| | Degas @300° C. for 1 hour |
| | 1.4 MPa Stabilization @300° C. Heat |
| | Degas @300° C. for 1 hour |
| | Hand grind (mortar & pestle) |
| Example 2 | 6 MPa activation + Desorption @30° C. |
| | 6 MPa Auto PCT @30° C. |
| | 6 MPa Auto PCT @60° C. |
| | Degas @300° C. for 1 hour |
| | Hand grind (mortar & pestle) |
| Example 3 | 6 MPa activation |
| | Degas @30° C. for 1 hour |
| | Hand grind (mortar & pestle) |

The activated alloys of the control using traditional activation methods and those produced as per the processes of Examples 1-3 are subjected to analyses for gas phase hydrogen storage characteristics and electrochemical properties as well as structural arrangements.

XRD Analyses

Figure 2:
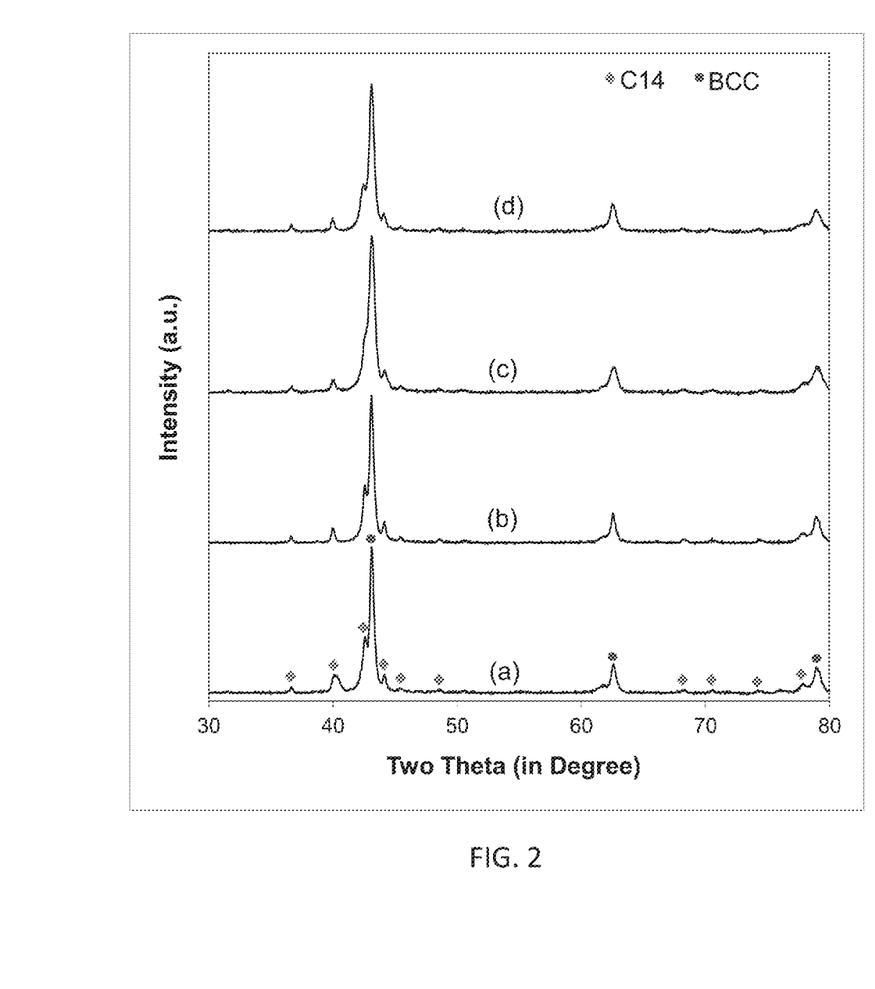
FIG. 2 illustrates the microstructure of hydrogen storage alloys activated to provide improved electrochemical properties and illustrating two predominant phases, C14 and BCC.
Figure 3:
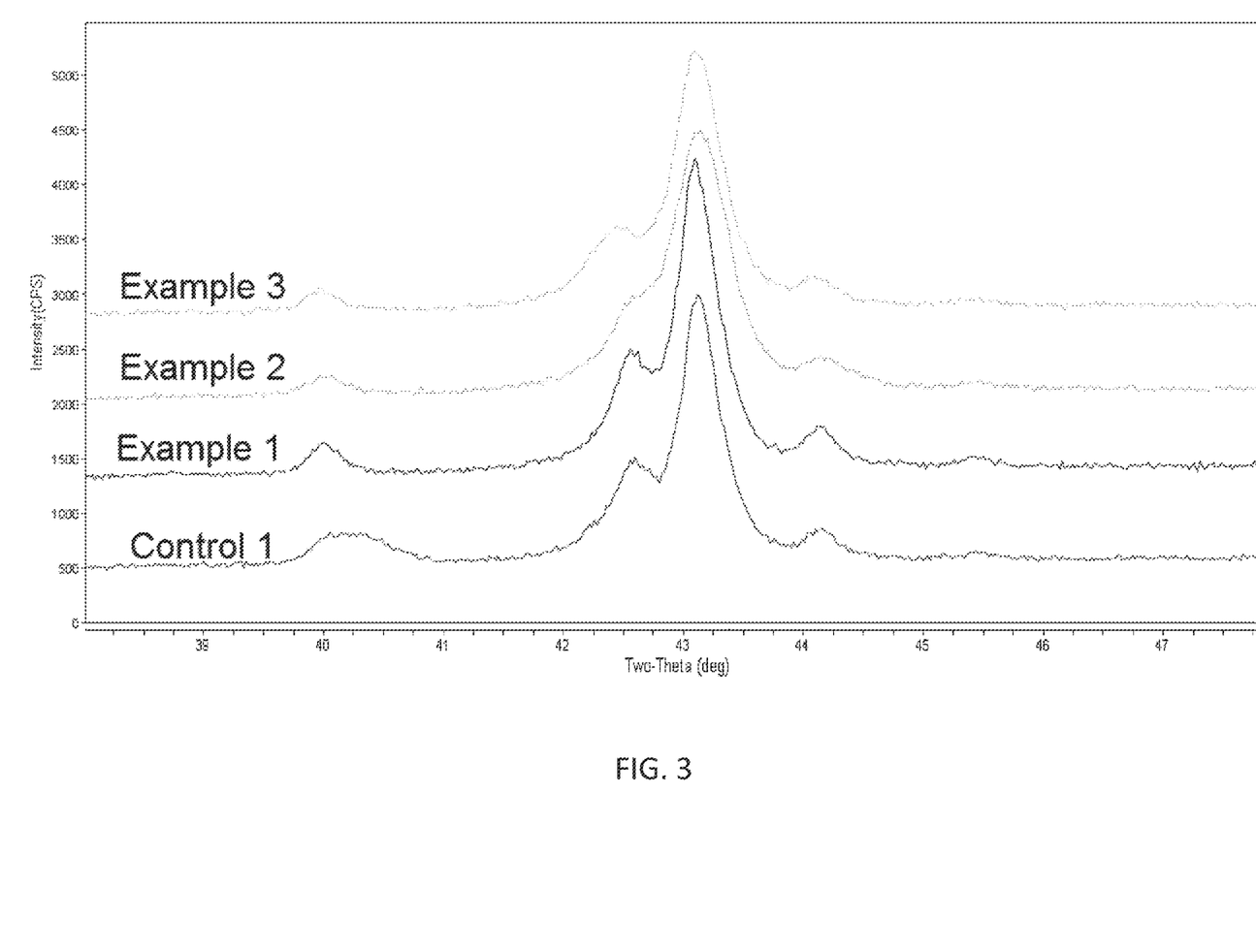
FIG. 3 illustrates the FWHM of the BCC (110) peak from control and hydrogen storage alloys activated to provide improved electrochemical properties and demonstrating the reduced crystallite size of the alloys activated by exemplary processes as described herein.

Microstructure of the activated alloys was studied utilizing a Philips X'Pert Pro x-ray diffractometer. The XRD patterns of the 4 samples (control (a) and Examples 1-3 (b-d, respesctively)) are shown in FIG. 2. Two sets of diffraction peaks are observed, C14 and BCC, indicating the significance of these structures in the overall system. The crystallite sizes of each phase are obtained from full pattern fitting of the XRD data using the Rietveld method and Jade 9 software. FIG. 3 illustrates the FWHM of the BCC peak (110) as it is varied between the control and the samples activated by the new processes. The calculated crystallite sizes of the BCC phase are presented in Table 4.

TABLE 4

Crystallite sizes of the BCC (110) phase.

| | HWHM (°) | BCC Phase Crystallite Size (Å) |
|---|---|---|
| Control 1 | 0.27 | 406 |
| Example 1 | 0.341 | 298 |
| Example 2 | 0.474 | 201 |
| Example 3 | 0.393 | 251 |

Each of the exemplary activated materials show crystallite sizes of the BCC phase of less than 300 Å.

Lattice constants a and c from each sample are listed in Table 5.

TABLE 5

| | a | c |
|---|---|---|
| Control 1 | 4.9004 | 7.9302 |
| Example 1 | 4.9005 | 7.9761 |
| Example 2 | 4.8939 | 7.9737 |
| Example 3 | 4.909 | 7.9916 |

Gaseous Phase Characteristics

The gaseous phase hydrogen storage characteristics of the control and of Examples 1-3 were measured using a Suzuki-Shokan multi-channel pressure-concentration-temperature (PCT) system. The PCT isotherms at 30° C. and 60° C. were then measured. The resulting absorption and desorption isotherms for the Control and the alloy active as per Example 1 are presented in FIG. 4.

Figure 4:
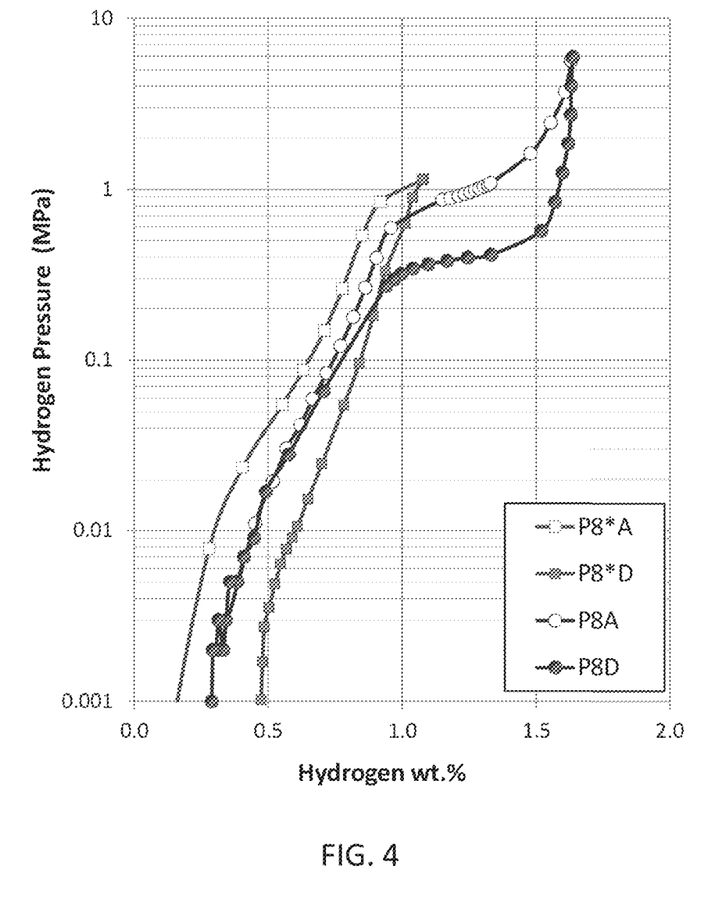
FIG. 4 illustrates gaseous phase hydrogen storage characteristics of various alloy materials formed by exemplary processes as described herein.

The Control material shows significant hysteresis and does not exceed 1.1% hydrogen weight percentage after activation. The same material activated by a process that uses the identical hydrogen gas pressure, but controls the maximum temperature of the alloy during activation so as not to exceed 300° C. shows completion of the second plateau and hydrogen weight percentage above 1.5%.

The hysteresis of the PCT isotherm is defined as ln $(P_a/P_d)$, where $P_a$ and $P_d$ are the absorption and desorption equilibrium pressures at the mid-point of desorption isotherm, respectively. The hysteresis can be used to predict the pulverization rate of the alloy during cycling. Alloys with larger hysteresis have higher pulverization rates during hydriding/dehydriding cycles. From the hysteresis, a large increase in cycle stability is expected by activating according to the processes of Examples 1-3. Particularly, by cooling the ingot during activation so that the maximum temperature does not exceed 300° C., the hysteresis decreases significantly.

Electrochemical Characterization

The discharge capacity of each alloy (Control or Examples) was measured in a flooded-cell configuration against a partially pre-charged $Ni(OH)_2$ positive electrode. For the half-cell electrochemical studies, each ingot was first ground and then passed through a 200-mesh sieve. The sieved powder was then compacted onto an expanded nickel metal substrate by a 10-ton press to form a test electrode (about 1 cm² in area and 0.2 mm thick) without using any binder. This allowed improved measurement of the activation behavior. Discharge capacities of the resulting small-sized electrodes were measured in a flooded cell configuration using a partially pre-charged $Ni(OH)_2$ pasted electrode as the positive electrode and a 6M KOH solution as the electrolyte. The system was charged at a current density of 100 mA/g for 5 h and then discharged at a current density of 50 mA/g until a cut-off voltage of 0.9 V was reached. The system was then discharged at a current density of 12 mA/g until a cut-off voltage of 0.9 V was reached and finally discharged at a current density of 4 mA/g until a cut-off voltage of 0.9 V was reached.

The obtained half-cell capacities are illustrated in Table 6.

TABLE 6

Summary of electrochemical properties of alloys active by control or exemplary processes.

| | 50 mAh/g | 4 mAh/g |
|---|---|---|
| Control | 167 | 172 |
| Example 1 | 308 | 346 |
| Example 2 | 354 | 375 |
| Example 3 | 294 | 322 |

Overall, compared to the control sample, those activated using cooling to 300° C. or less or activated by increased hydrogen pressure showed: greatly improved electrochemical capacities of nearly 300 mAh/g or greater; increased capacities gas phase capacity; and flatter PCT isotherms with decreased hysteresis.

Patents, publications, and applications mentioned in the specification are indicative of the levels of those skilled in the art to which the invention pertains. These patents, publications, and applications are incorporated herein by reference to the same extent as if each individual patent, publication, or application was specifically and individually incorporated herein by reference.

In view of the foregoing, it is to be understood that other modifications and variations of the present invention may be implemented. The foregoing drawings, discussion, and description are illustrative of some specific embodiments of the invention but are not meant to be limitations upon the practice thereof. It is the following claims, including all equivalents, which define the scope of the invention.

The invention claimed is:

1. A process of activating a mixed BCC and Laves phase metal hydride alloy of Formula I:

$$Ti_wV_xCr_yM_z \qquad (I)$$

where w+x+y+z=1, 0.1≤w≤0.6, 0.1≤x≤0.6, 0.01≤y≤0.6, and M is selected from the group consisting of B, Al, Si, Sn and transition metals, said process comprising:
(i) subjecting said mixed BCC and Laves phase metal hydride alloy to an atmosphere comprising hydrogen at a hydrogenation pressure of 2.6 megapascals or greater; and
(ii) cooling said alloy during said step of subjecting to produce an activated metal hydride alloy having a capacity in excess of 200 milliamperes per gram, wherein cooling is at a maximum activation temperature of 300 degrees Celsius or less.

2. The process of claim 1 wherein said hydrogenation pressure is 4 megapascals or greater.

3. The process of claim 1 wherein said hydrogenation pressure is 6 megapascals or greater.

4. The process of claim 1 wherein said activated metal hydride alloy has a capacity of 300 milliamperes per gram or greater.

5. The process of claim 1 wherein said activated metal hydride alloy has a capacity of 350 milliamperes per gram or greater.

6. The process of claim 1 wherein said activated metal hydride alloy has less than 24% C14 phase.

7. The process of claim 1 wherein said activated metal hydride alloy is predominantly a combination of BCC phase and Laves phase, said BCC phase in abundance of greater than 5% and less than 95%, said Laves phase in abundance of greater than 5% and less than 95%.

8. The process of claim 1 wherein said activated metal hydride alloy comprises a BCC phase crystallite size of less than 400 angstroms.

9. The process of claim 1 wherein said mixed BCC and Laves phase metal hydride alloy is of Formula II:

$$Ti_{0.4+x/6}Zr_{0.6-x/6}Mn_{0.44}Ni_{1.0}Al_{0.02}Co_{0.09}(VCr_{0.3}Fe_{0.063})_x \qquad (II)$$

where x is 0.7 to 2.8.

10. A process of hydrogenating a mixed BCC and Laves phase metal hydride alloy of Formula I:

$$Ti_wV_xCr_yM_z \qquad (I)$$

where w+x+y+z=1, 0.1≤w≤0.6, 0.1≤x≤0.6, 0.01≤y≤0.6, and M is selected from the group consisting of B, Al, Si, Sn and transition metals, said process comprising:
(i) subjecting said mixed BCC and Laves pahse metal hydride alloy to an atmosphere comprising hydrogen at a hydrogenation pressure at or greater than 4 megapascals; and
(ii) cooling said mixed BCC and Laves phase metal hydride alloy during step (i) to a maximum activation temperature of 300 degrees Celsius or less to produce an activated metal hydride alloy having a capacity in excess of 200 milliamperes per gram.

11. The process of claim 10 wherein said activated metal hydride alloy has a capacity of 300 milliamperes per gram or greater.

12. The process of claim 10 wherein said activated metal hydride alloy has a capacity of 350 milliamperes per gram or greater.

13. The process of claim 10 wherein said activated metal hydride alloy is predominantly a combination of BCC phase and Laves phase, said BCC phase in abundance of greater than 5% and less than 95%, said Laves phase in abundance of greater than 5% and less than 95%.

14. The process of claim 10 wherein said activated metal hydride alloy comprises a BCC phase crystallite size of less than 400 angstroms.

* * * * *